(12) United States Patent
Malmberg

(10) Patent No.: US 8,225,938 B2
(45) Date of Patent: Jul. 24, 2012

(54) FIXING OF SCREENING MEDIA

(75) Inventor: Mats Malmberg, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 495 days.

(21) Appl. No.: 12/465,010

(22) Filed: May 13, 2009

(65) Prior Publication Data

US 2009/0285049 A1 Nov. 19, 2009

(30) Foreign Application Priority Data

May 15, 2008 (SE) ........................................ 0801099

(51) Int. Cl.
*B07B 1/46* (2006.01)
(52) U.S. Cl. ........................................ 209/405; 209/408
(58) Field of Classification Search .................. 209/319, 209/405, 408, 409, 412, 413
See application file for complete search history.

(56) References Cited

U.S. PATENT DOCUMENTS

| | | | | |
|---|---|---|---|---|
| 190,991 | A * | 5/1877 | Weed | 209/319 |
| 2,190,993 | A * | 2/1940 | Muir | 209/319 |
| 3,092,573 | A * | 6/1963 | Lambert et al. | 209/403 |
| 3,203,548 | A * | 8/1965 | Roubal | 209/399 |
| 3,307,699 | A * | 3/1967 | Shira | 209/403 |
| 3,346,114 | A * | 10/1967 | Hoyt | 209/403 |
| 3,369,662 | A * | 2/1968 | Rohner | 209/403 |
| 5,785,461 | A * | 7/1998 | Lambert | 403/167 |
| 7,228,971 | B2 * | 6/2007 | Mooney et al. | 209/398 |

* cited by examiner

*Primary Examiner* — Joseph C Rodriguez
(74) *Attorney, Agent, or Firm* — Morgan, Lewis & Bockius LLP

(57) ABSTRACT

An adapter system for fixing different screening media to a vibrating screen. By way of the adapter system, different side hold downs used for different screening media may be fixed to a wall of the vibrating screen without any modifications of the wall. The adapter system includes an insert to be placed in an opening of the wall. An adapter is attached to the insert at a desired height in relation to the insert. The insert has a number of parallel grooves co-operating with parallel ribs on the adapter in order to attach the adapter to the insert.

10 Claims, 4 Drawing Sheets

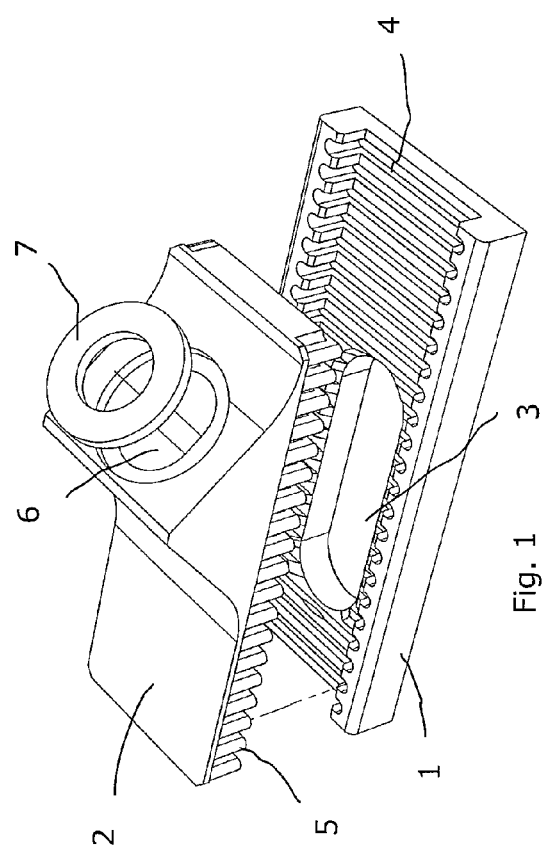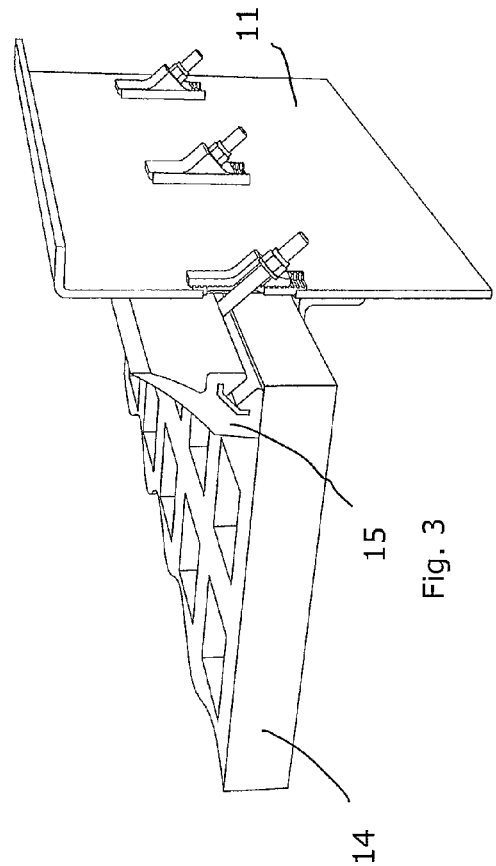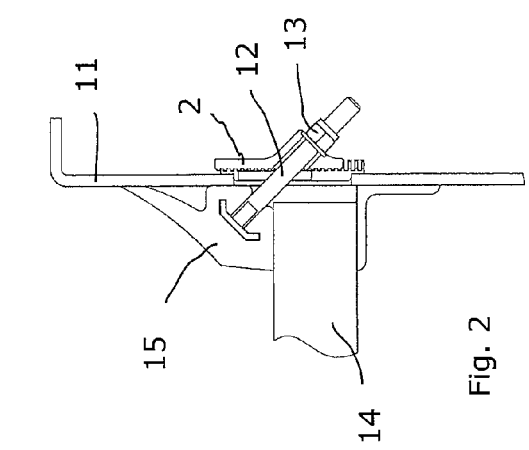

US 8,225,938 B2

FIXING OF SCREENING MEDIA

CROSS-REFERENCE TO PRIOR APPLICATION

This application claims priority to Sweden Application No. 0801099-3 filed May 15, 2008, which is incorporated by reference herein.

BACKGROUND OF THE INVENTION

The present invention concerns an adapter system for fixing different screening media to a vibrating screen which includes an insert placed at the wall of the screen and an adapter attached to the insert at a desired height in relation to the insert.

FIELD OF THE INVENTION

In vibrating screens used for separation of, for example, crushed stones and gravel into fractions of stones with different sizes, screening media are used having screening holes for allowing stones smaller than the screening holes to pass through the screening media. The screens may have different types of screening media placed between two sidewalls of the screen. Side hold downs are used to hold the screening media in position on the screen. The hold downs have different designs depending on the type of screening media used. Normally, the hold downs are fixed to the sidewalls of the screen by a fastening device, such as a bolt and nut arrangement, going through openings of each sidewall.

SUMMARY

Depending on the design and size of the different medias, the side hold downs will have different designs. The different designs of the side hold downs will need fixation devices at different positions and having different inclinations to fix the hold downs to the screen wall.

One object of the present invention is to have a system making it possible to use the same opening in the sidewall independently of the type, design and size of the screening media, side hold downs and fixation devices. Thereby, the same general screen may be used for the different screening media. Thus, it is possible to shift type of screening media without having to change or rebuild the screen or the sidewalls of the screen. The screening media may be pre-tensioned screen panels, cross-tensioned screening media, longitudinally tensioned screening media, modular system, self-supporting media, etc., including possible side protections.

The present invention includes an adapter system for fixing screening media to a wall of a vibrating screen. The adapter system includes an insert placed at the wall of the screen and an adapter attached to the insert at a desired height in relation to the insert. The insert has a number of parallel grooves for co-operation with a number of parallel ribs on the adapter, the grooves and ribs being arranged on the sides of the insert and adapter, respectively, to face each other at installation.

BRIEF DESCRIPTION OF THE DRAWINGS

The invention will be described further below by way of an example and with reference to the enclosed drawings. In the drawings:

FIG. 1 is an exploded perspective view of an adapter system according to the present invention, FIG. 2 is a side view in section, illustrating fixation of screening media to a wall of a vibrating screen, FIG. 3 is a perspective view partly in section of the fixation of FIG. 2.

DETAILED DESCRIPTION OF THE PREFERRED EMBODIMENTS

Figure 4:
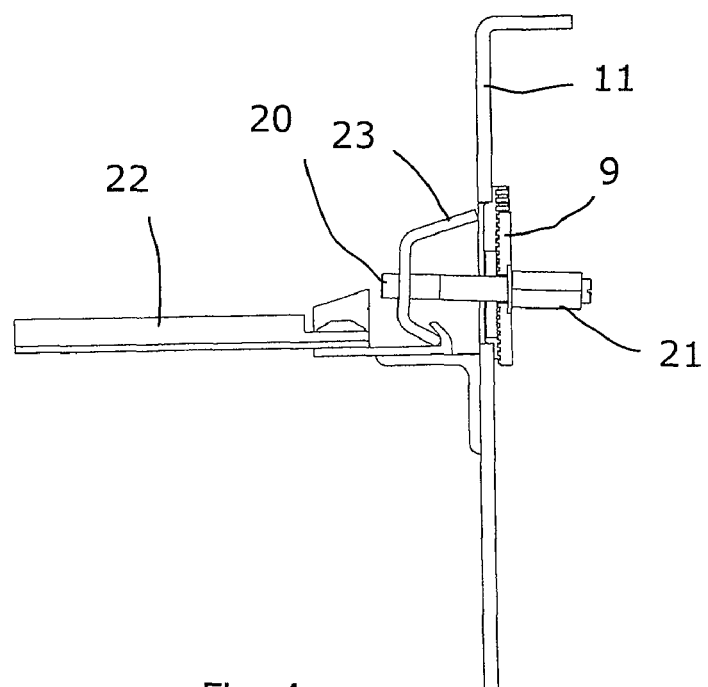
FIG. 4 is a view corresponding with FIG. 2, illustrating fixation of another type of screening media.

The adapter system of the present invention has an insert 1, to receive an adapter 2 at different, optional positions. The insert 1 has a longitudinal extent with the general form of a plate, having two sidewalls at right angles to the plate. Thereby the insert 1 will have a trough form, inside which the adapter 2 is to be received. The insert 1 has a through opening 3, which opening 3 has an oblong form. Inside the trough of the insert 1, i.e., the side facing the adapter 2, a number of parallel grooves 4 are formed.

The grooves 4 of the insert 1 are to cooperate with a number of parallel ribs 5 on the adapter 2. The grooves 4 of the insert 1 and the ribs 5 of the adapter 2 are arranged over the entire side of respective part. In order for the adapter to stay in place, there should be a tight fit between the grooves 4 and the ribs 5.

The adapter 2 has a raised part 17 with a through opening 6. The raised part 17 is arranged on the side of the adapter 2 opposed to the side having ribs 5. The raised part 17 is countersunk around the through opening 6. A washer 7 is received inside the countersunk part.

The insert 3 has a protrusion 16 on the side opposite the side having grooves 4. The protrusion 16 has an oblong rounded form corresponding with the form of the through opening 3 of the insert 1. The dimension of the through opening 3 is such that it is placed inside the protrusion 16. The through opening 3 is placed at an end of the protrusion 16. The protrusion 16 is to be received in an opening of the wall 11 of the screen. The protrusion 16 may have elements to give a snap locking with the wall 11 of the screen. In the shown embodiment this is done by a lip 18 on the outside of the protrusion 16, whereby the lip 18 is placed at a distance from the main part of the insert 1 adapted to the thickness of the wall 11 of the screen.

The oblong through opening 3 of the insert 1 is placed towards one side in the longitudinal direction of the insert 1. Thereby the position of the opening 3 depends on the orientation of the insert 1. The insert 1 may be placed in one of two positions. The two positions are turned 180° in relation to each other in the plane of the wall 11 of the vibrating screen.

In FIGS. 2 and 3, a first example of fixation of a screening media 14 is shown. A side hold down 15 for screening media 14 is fixed by way of a bolt 12 and nut 13 to a wall 11 of a screen. The bolt goes through an opening of the side hold down 15, an opening of the wall 11 of the screen, the oblong opening 3 of the insert 1 and the through opening 6 of the adapter 2.

Figure 5:
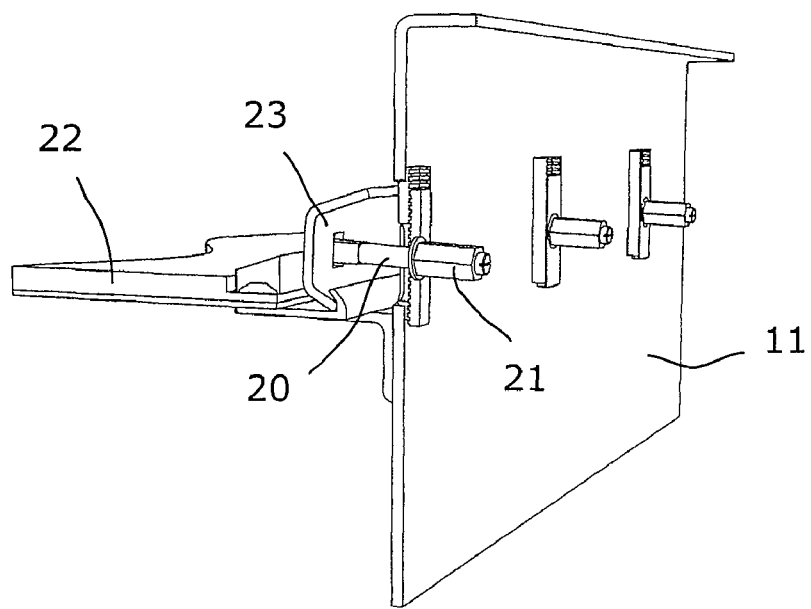
FIG. 5 is a perspective view partly in section of the fixation of FIG. 4.
Figure 6:
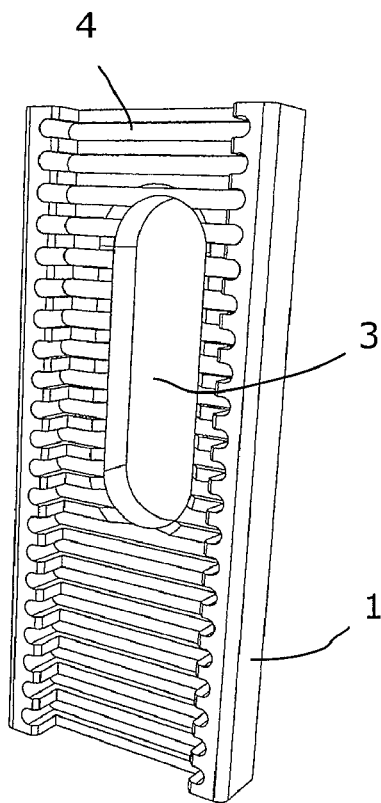
FIG. 6 is a perspective view of an insert of an adapter system according to the present invention.
Figure 7:
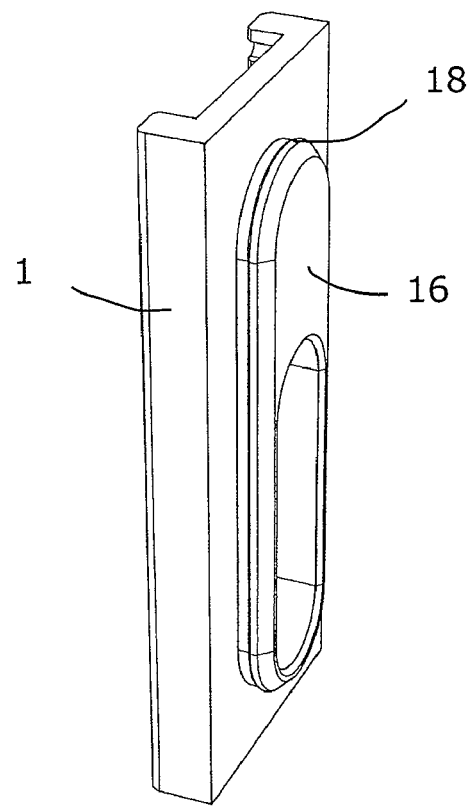
FIG. 7 is a perspective view from the other side of the insert of FIG. 6.
Figure 8:
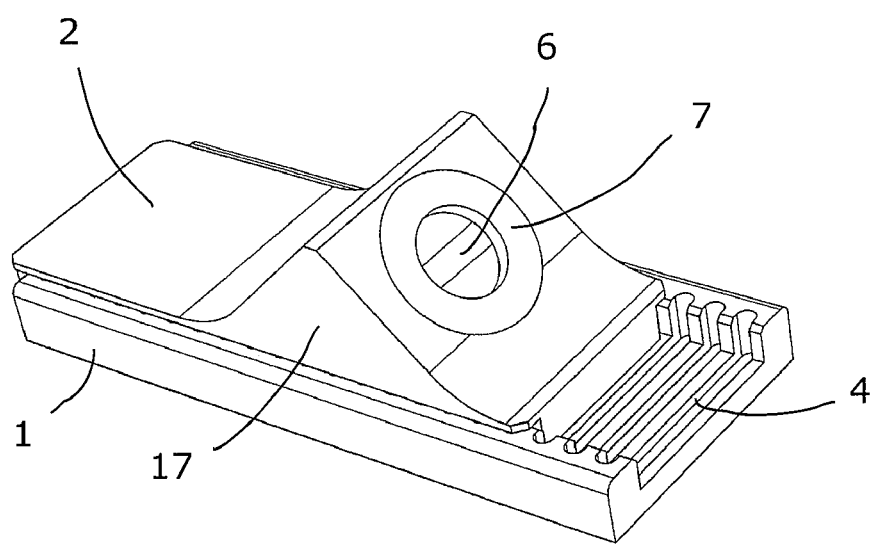
FIG. 8 is a perspective view of the adapter system according of FIG. 1 in an assembled condition.

In FIGS. 4 and 5, a second example of fixation of a screening media 22 is shown. A side hold down 23 for screening media 22 is fixed by way of a bolt 20 and nut 21 to a wall 11 of a screen. The bolt goes through an opening of the side hold down 23, an opening of the wall 11 of the screen, the oblong opening 3 of the insert 1 and the through opening 6 of the adapter 9.

From the above described examples of fixation, one having ordinary skill in the art would understand that the side hold downs 15, 23 may be formed in many different ways.

Figure 9:
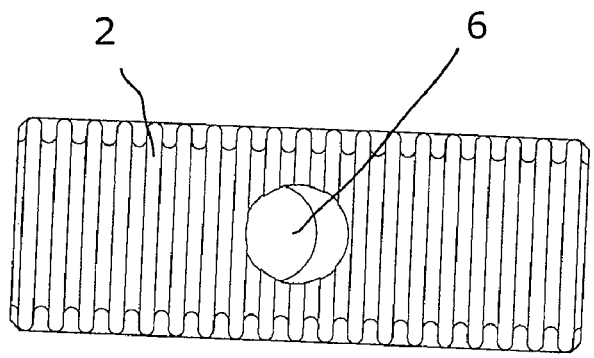
FIG. 9 is a plan view from below of the adapter of FIG. 8
Figure 10:
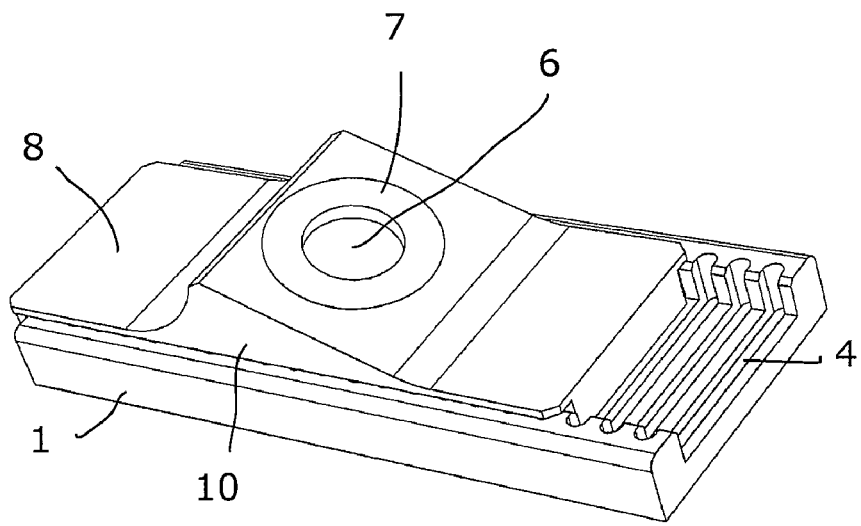
FIG. 10 is a perspective view of the adapter system with a second example of an adapter according to the present invention.
Figure 11:
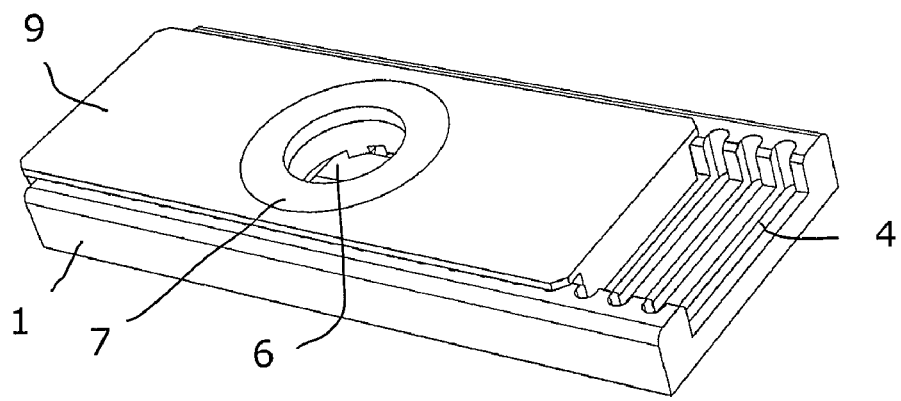
FIG. 11 is a perspective view of the adapter system with a third example of an adapter according to the present invention.

In the FIGS. 1, 8, 10 and 11, different examples of adapters are shown. The only difference between these embodiments is the inclination of the central part of respective adapter. However, with regard to the embodiment of FIG. 11, there is no inclination and, thus, the adapter 9 of FIG. 11 has no raised part but a substantially flat upper surface. The raised part 17 of the adapter 2 of FIG. 8 inclines more than the raised part 10 of the adapter 8 of FIG. 10. As indicated above, the inclination of respective raised part 10, 17 or no raised part is adapted to the actual screening media 14 and the actual side hold down 15 used. The side of the adapter 2, 8, 9 having the ribs 5 looks the same irrespectively of which adapter it is referred to, and it is generally showed in FIG. 9. The only difference between the different adapters 2, 8, 9 is the inclination of the through opening 6. One having ordinary skill in the art would understand that the adapters may have further embodiments. The through opening 6 of the adapter may have different forms depending on the intended use. In some embodiments, the through opening is circular while it has an oblong rounded form in other embodiments. The oblong rounded form facilitates mounting in some instances.

The same insert 1 is used independently of which adapter 2, 8, 9 that is used. In use the insert 1 is placed with the desired orientation in the opening of the wall 11 of the screen. The insert 1 is placed on the outside of the wall 11 of the screen, thus, on the side opposite the screening media. The orientation being dictated by the adapter 2, 8, 9 to be used and the position for the fastening device, such as a bolt 12, 20 and nut 13, 21 assembly. The insert 1 is held loosely at the wall 11 by way of co-operation between the lip 18 of the protrusion 16 and the opening of the wall 11. The chosen adapter 2, 8, 9 is placed in the insert 1 at an appropriate height. The screening media 14, 22 adapter 2, 8, 9 and side hold down 15, 23 used dictate the appropriate height. The adapter 2, 8, 9 is held loosely at the insert by co-operation between the grooves 4 of the insert 1 and the ribs 5 of the adapter 2, 8, 9. There is a tight fit between the grooves 4 and ribs 5. The side hold down 15, 23 is placed to hold the screening media 14, 22 at the wall 11 of the screening media and the bolt 12, 20 is inserted through the openings of the hold down 15, 23, the wall 11 of the screen, the insert 1, and the adapter 2, 8, 9. Thereafter the bolt 12, 20 is fixed by way of the nut 13, 21. One having ordinary skill in the art would understand that any fixation device giving the desired fixation may be used. One having ordinary skill in the art would also understand that a bolt or other fixation device may be inserted in any direction.

The position and inclination of the through opening of the adapter system to receive the bolt of the hold down may be regulated by the orientation of the insert, the type of adapter 2, 8, 9 used and the position of the adapter 2, 8, 9 in relation to the insert 1.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. An adapter system for fixing screening media to a wall of a vibrating screen, comprising:
   an insert placed at the wall of the screen;
   an adapter attached to the insert at a desired height in relation to the insert;
   wherein the insert has a number of parallel grooves for co-operation with a number of parallel ribs on the adapter, the grooves and ribs being arranged on the sides of the insert and adapter, respectively, to face each other at installation,
   wherein the insert has the form of a plate with two walls giving a trough form and wherein the adapter is received inside the trough of the insert with a press fit between the grooves of the insert and the ribs of the adapter.

2. The adapter system of claim 1, wherein the grooves and ribs are arranged over all of the respective surfaces of the insert and the adapter, respectively.

3. The adapter system of claim 1, wherein the insert has an oblong through opening and wherein the adapter has a through opening.

4. The adapter system of claim 3, wherein the oblong opening of the insert is placed offset from a central position in the longitudinal direction of the insert.

5. The adapter system of claim 1, wherein the insert has a protrusion on the side of the insert facing the wall of the screen at installation and wherein the protrusion is sized to give a press fit with an opening in the wall of the screen.

6. The adapter system of claim 5, wherein the protrusion has a lip whereby the wall is snapped in between the lip of the protrusion and the adjacent surface of the insert.

7. An adapter system for fixing screening media to a wall of a vibrating screen, comprising:
   an insert placed at the wall of the screen;
   an adapter attached to the insert at a desired height in relation to the insert;
   wherein the insert has a number of parallel grooves for co-operation with a number of parallel ribs on the adapter, the grooves and ribs being arranged on the sides of the insert and adapter, respectively, to face each other at installation,
   wherein the insert has an oblong through opening and the adapter has a through opening, and
   wherein the adapter has a raised part having an inclined surface, wherein the inclination of the inclined surface of the adapter is adapted to screening media and side hold downs used and wherein the through opening of the adapter goes through the inclined surface.

8. The adapter system of claim 1, wherein the adapter has a plane upper surface.

9. An adapter system for fixing screening media to a wall of a vibrating screen, comprising:
   an insert placed at the wall of the screen;
   an adapter attached to the insert at a desired height in relation to the insert;
   wherein the insert has a number of parallel grooves for co-operation with a number of parallel ribs on the adapter, the grooves and ribs being arranged on the sides of the insert and adapter, respectively, to face each other at installation,
   wherein the insert has a protrusion on the side of the insert facing the wall of the screen at installation and wherein the protrusion is sized to give a press fit with an opening in the wall of the screen, and wherein the insert is inserted in one of two position in the opening of the wall of the screen, with one position turned 180° in relation to the other position in the plane of the wall, whereby the oblong opening of the insert will be positioned at different heights in the two positions.

10. An method of fixing screening media to a wall of a vibrating Screen using an adapter system, comprising:
placing an insert at the wall of the screen; and
attaching an adapter to the insert at a desired height in relation to the insert,
wherein the insert has a number of parallel grooves for co-operation with a number of parallel ribs on the adapter, the grooves and ribs being arranged on the sides of the insert and adapter, respectively, to face each other at installation,
wherein the insert has the form of a plate with two walls giving a trough form and wherein the adapter is received inside the trough of the insert with a press fit between the grooves of the insert and the ribs of the adapter.

* * * * *